United States Patent
Cheneau-Grehalle et al.

(10) Patent No.: US 8,725,155 B2
(45) Date of Patent: May 13, 2014

(54) PROCESS FOR UPDATING LOCATION INFORMATION

(75) Inventors: Emilie Cheneau-Grehalle, Le Mans (FR); Alain Seguie, Louailles (FR)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/496,417

(22) PCT Filed: Sep. 22, 2010

(86) PCT No.: PCT/EP2010/063995
§ 371 (c)(1),
(2), (4) Date: Mar. 15, 2012

(87) PCT Pub. No.: WO2011/036186
PCT Pub. Date: Mar. 31, 2011

(65) Prior Publication Data
US 2012/0178458 A1    Jul. 12, 2012

(30) Foreign Application Priority Data

Sep. 23, 2009    (FR) ...................................... 09 56576

(51) Int. Cl.
*H04W 36/00*        (2009.01)
(52) U.S. Cl.
USPC ...... 455/440; 455/422.1; 455/436; 455/456.1
(58) Field of Classification Search
USPC ............................. 455/422.1, 436, 440, 456.1
See application file for complete search history.

(56) References Cited

U.S. PATENT DOCUMENTS

| | | | |
|---|---|---|---|
| 5,123,111 A | 6/1992 | Delory et al. | |
| 5,842,128 A | 11/1998 | Kito et al. | |
| 6,195,550 B1 * | 2/2001 | Sollee et al. | 455/432.1 |
| 6,950,415 B2 * | 9/2005 | Chang et al. | 370/331 |
| 2005/0148330 A1 * | 7/2005 | Alberth et al. | 455/435.1 |
| 2005/0197126 A1 * | 9/2005 | Kang et al. | 455/442 |
| 2005/0208945 A1 * | 9/2005 | Hong et al. | 455/436 |
| 2005/0277417 A1 * | 12/2005 | Yoon et al. | 455/436 |
| 2006/0256749 A1 * | 11/2006 | Rexhepi et al. | 370/329 |
| 2010/0189035 A1 * | 7/2010 | Pehrsson et al. | 370/328 |

FOREIGN PATENT DOCUMENTS

| | | |
|---|---|---|
| EP | 0554093 A2 | 8/1993 |
| WO | 2005020617 A1 | 3/2005 |

OTHER PUBLICATIONS

Patent Cooperation Treaty International Search Report and Written Opinion of PCT/EP2010/063995; Carlo Luca Donnini; Oct. 20, 2010; 10 pages.

Institut National De La Propriete Industrielle; Rapport de Recherche Preliminaire, French Search Report and Written Opinion; Carlo Luca Donnini; May 26, 2010; 7 pages.

* cited by examiner

*Primary Examiner* — Liton Miah
(74) *Attorney, Agent, or Firm* — Howison & Arnott, L.L.P.

(57) ABSTRACT

A location management method for a mobile terminal in a telecommunications network is provided in which when the mobile terminal is traveling from a first cell to a second cell in the network, an identifier associated with the mobile terminal in the cell in which it is located is established. The mobile terminal receives a first identifier associated with the first cell that enables the mobile terminal to be located in the network when it is within the first cell. The mobile terminal receives a second identifier associated with the second cell that enables the mobile terminal to be located in the network when it is within the second cell. The mobile terminal and/or the network store the identifiers in a table of identifiers, in order to use the first identifier or the second identifier depending on whether the mobile terminal is within the first or second cell, respectively.

12 Claims, 6 Drawing Sheets

PROCESS FOR UPDATING LOCATION INFORMATION

CROSS-REFERENCE TO RELATED APPLICATIONS

This application is a U.S. National Phase application submitted under 35 U.S.C. §371 of Patent Cooperation Treaty application serial no. PCT/EP2010/063995, filed Sep. 22, 2010, and entitled PROCESS FOR UPDATING LOCATION INFORMATION, which application claims priority to French patent application serial no. 09 56576, filed Sep. 23, 2009, and entitled PROCESS FOR UPDATING LOCATION INFORMATION.

Patent Cooperation Treaty application serial no. PCT/EP2010/063995, published as WO 2011/036186, and French patent application serial no. 09 56576, are incorporated herein by reference.

TECHNICAL FIELD

This invention relates to the field of telecommunications.

More particularly, it relates to the identification and location functionality of a mobile terminal in a telecommunications network.

BACKGROUND

In most telecommunications networks (such as GSM, UMTS or LTE), a functionality exists for identifying and locating mobile terminals on a regular basis in order to route calls and data to them.

An identifier called the IMSI (International Mobile Subscriber Identity) is stored in each SIM (or USIM) card. This identifier identifies a subscriber associated with the SIM card in any telecommunications network in any geographical area. For example, the IMSI allows identifying the country of origin of the subscriber, the network he subscribes to, as well as his identity. Because the SIM card is inserted in a mobile terminal, the IMSI identifies the terminal.

To ensure a certain degree of anonymity for the user of the mobile terminal, the IMSI number is exchanged in a very limited manner between the mobile terminal and the entities that manage the network.

Each time the mobile terminal is turned on, the IMSI is exchanged only once, then the network sends the mobile terminal a temporary identification number or TMSI (Temporary Mobile Subscriber Identity). This TMSI number is then used in exchanges between the mobile terminal and the network until the mobile terminal is turned off or leaves the network.

The TMSI is also associated with particular areas in the network. As the network is subdivided into cells, a TMSI is delivered to the mobile terminal each time it enters a new cell. Such terminal location updating is, for example, required by the 3GPP standard (3GPP 24.008).

At all times the mobile terminal is therefore identified by a unique TMSI uniquely associated with a network cell.

Figure 1:
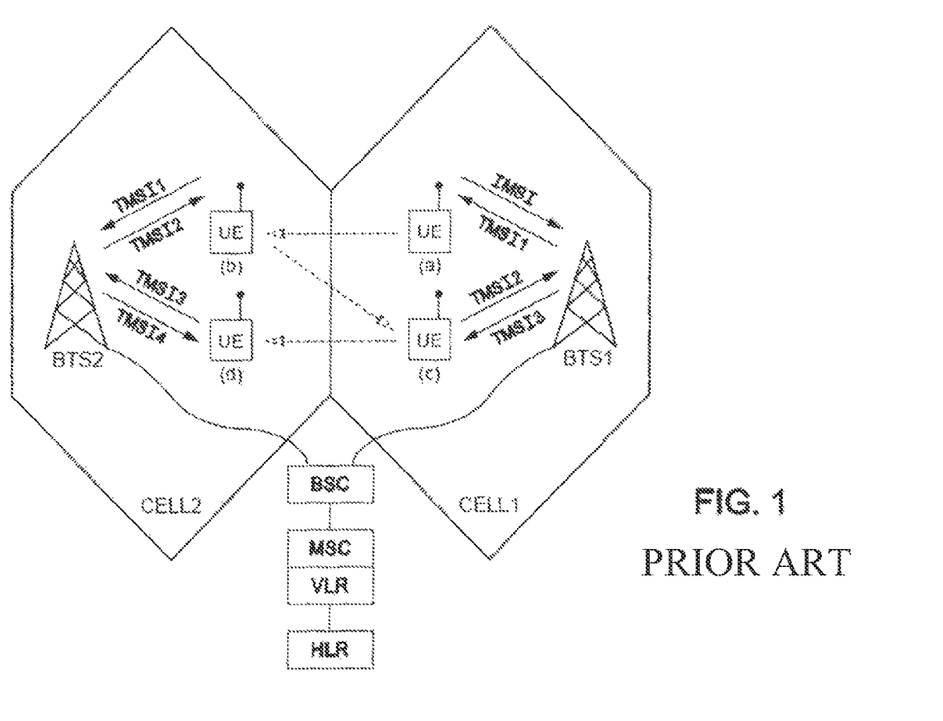

The prior art process of allocating the TMSI is illustrated in FIG. 1.

In FIG. 1, two cells CELL1 and CELL2 of a telecommunications network are represented. Found in each of these cells is a base station BTS1 and BTS2 for communicating with the mobile terminals located in these cells. The base stations are controlled by base station controllers BSC1 and BSC2, which are connected to a mobile communications control center (MSC for Mobile Switching Center), which is itself connected to VLR and HLR registers in order to manage the mobile terminals subscribed to the network and those in transit within the network.

The terminal (UE for User Equipment) travels through cells CELL1 and CELL2 between positions a, b, c, and d. Positions a and c are within the coverage of CELL1 and positions b and d are within the coverage of CELL2.

When the mobile terminal UE is turned on, it transmits its IMSI number to the MSC via the base station BTS1. In response, the MSC assigns it a temporary number TMSI1. This number is then used by the mobile terminal and the network for all data exchanges as long as the terminal does not leave CELL1.

In order to travel to position b, the mobile terminal leaves CELL1 and arrives in CELL2. As it enters this new cell, the mobile terminal transmits a location update request. For this purpose it transmits its number TMSI1 to the MSC via the base station BTS2. In response, the mobile terminal receives a new identification number TMSI2. This new number identifies it in CELL2, and this number is used for all communications between the mobile terminal and the network as long as it does not leave CELL2.

In order to travel to position c, the mobile terminal leaves CELL2 and returns to CELL1. When it arrives in CELL1, it sends a location update request and transmits its number TMSI2 to the MSC via the base station BTS1. In response, it receives a new identification number TMSI3. It is this new number that is used by the mobile terminal as long as it does not leave CELL1.

Lastly, in order to move to position d, the mobile terminal leaves CELL1 and arrives in CELL2. It transmits a new location update request and for this purpose sends its identification number TMSI3 to the MSC via the base station BTS2. In response, it receives a new identification number TMSI4 which it uses as long as it does not leave CELL2.

Each time it enters a new cell, the mobile terminal exchanges data in this manner with the network management units in order to receive a new identification number.

The result is a volume of exchanged data which monopolizes part of the bandwidth used for communications. In addition, this requires the implementation of special mechanisms within the network in order to manage the identification numbers.

On the mobile terminal side, the process requires the use of special resources which consume some of the battery power of the mobile terminal.

SUMMARY

A need therefore exists for optimizing the location and identification mechanisms of mobile terminals in telecommunications networks.

In particular, a need exists for economizing data transmissions between the mobile terminal and the network management units, notably to economize the resources used by the network and the mobile terminal.

This invention provides a response to these needs.

It proposes a location management method for a mobile terminal in a telecommunications network in which the mobile terminal is traveling from a first cell in the network to a second cell in the network, an identifier being associated with the terminal in the cell in which it is located. The method comprises:

receiving a first identifier for the terminal, associated with the first cell, this identifier enabling locating the mobile terminal in the network when it is within the first cell, and receiving a second identifier for the terminal, associated with the second cell, this identifier enabling locating the mobile terminal in the network when it is within the second cell.

The method additionally comprises:

storing the identifiers in a table of identifiers, in order to use the first identifier and/or the second identifier depending on whether the terminal is within the first and/or second cell.

For example, the identifiers are TMSI or P-TMSI (Packet-Temporary Mobile Subscriber Identity) numbers. These identifiers are used for example for voice or data communications in 2G, 3G or 4G networks.

The use of a table of identifiers particularly enables keeping a history of identifiers assigned to the mobile terminal.

Thus, when the mobile terminal returns to a previously visited cell, it is possible to reassign it the same identifier without redoing an identifier allocation process.

For example, the table of identifiers stores the identifier number as well as the designation of an area associated with this identifier. For example, the area associated with the identifier corresponds to the coverage area of a cell of the telecommunications network.

The table of identifiers can store more than two identifiers.

In some embodiments, the area associated with the identifier corresponds to the coverage area of multiple network cells.

For example, the table of identifiers comprises a previously fixed number of identifiers. As a further example, these are identifiers associated with network cells in which it is known beforehand that the mobile terminal is likely to travel.

The table of identifiers can be updated dynamically based on changes in the terminal location.

For example, the table of identifiers is a file created when the mobile telephone is turned on.

In some embodiments, the table of identifiers is stored on the terminal, or on a network management unit (for example the MSC). In other embodiments, there are two identical versions of the table of identifiers, one stored on the terminal and the other stored on the network management unit.

In this embodiment, the method of updating the table of identifiers is done by the terminal, the network management unit, or both.

The method can additionally comprise the following steps, implemented on the terminal:

detecting entry into the second cell, sending an identification request to the network management unit, and receiving the second identifier, which is delivered by the management unit.

The table of identifiers can thus be updated at the request of the mobile terminal each time it enters a new cell.

Prior to sending the identification request, the method may additionally comprise:

verifying whether an identifier associated with the second cell exists in the table of identifiers, and if such an identifier exists, using this identifier in the second cell, if it does not, sending the identification request.

When the table of identifiers already contains an identifier for the cell in which the terminal has just entered, the mechanism for allocating a new identifier and updating the table of identifiers is not initiated.

This reduces the communications between the mobile terminal and the network management entities.

In some embodiments, the method comprises:

receiving a message to update the table of identifiers.

This update message may be initiated by the network, the terminal, or both.

For example, the update message is for inserting a new identifier into the table of identifiers.

In some embodiments, terminal identifiers are proactively inserted into the table of identifiers. For example, depending on the configuration of the network cells or the movement of the terminal within the network, an identifier can be inserted that is associated with a cell which the terminal has not yet entered but will be entering.

For example, it is possible to insert an identifier associated with a cell that shares a certain coverage area with the cell in which the terminal is currently located.

As a further example, it is possible to insert an identifier associated with a cell on the travel path of the mobile terminal.

The update message can also comprise a request to delete an identifier from the table of identifiers.

When the table of identifiers is full it is therefore possible to delete identifiers which are no longer relevant to the travel path of the mobile terminal in the network.

For example, it is possible to delete identifiers associated with cells which do not share coverage with the cell in which the mobile terminal is currently located.

The update message can be received before or after an identification request.

The invention also provides a location management method for a mobile terminal, with steps corresponding to the method of the invention. The invention also provides a computer program comprising instructions for implementing the method of the invention, as well as a mobile terminal and a network management unit for implementing the method of the invention.

These objects of the invention have at least the same advantages as those provided by the method of the invention.

BRIEF DESCRIPTION OF THE DRAWINGS

Other features and advantages of the invention will become apparent upon reading the following description. This description is purely illustrative and is to be read with reference to the attached drawings, in which, in addition to FIG. 1.

DETAILED DESCRIPTION

Figure 2:
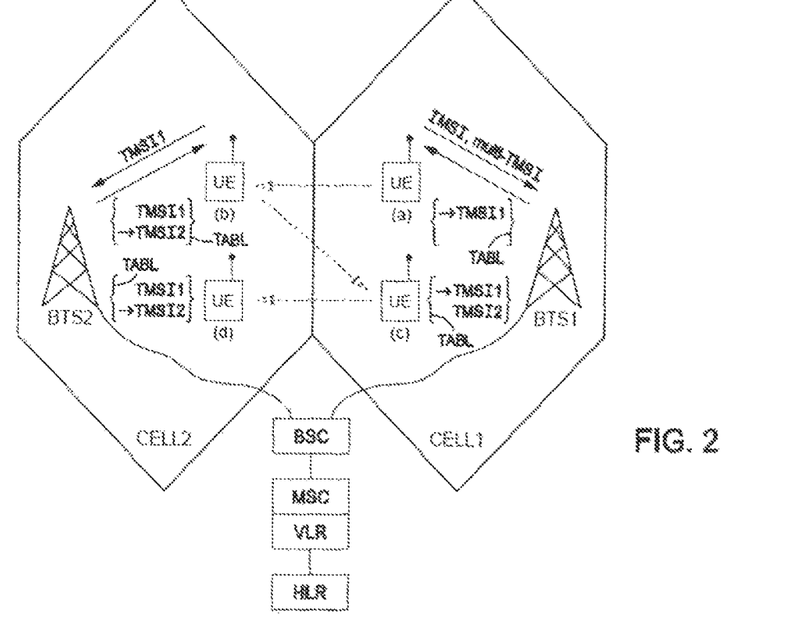
FIG. 2 illustrates a general context for implementing the method according to an embodiment of the invention.

A general context for implementing the method according to an embodiment of the invention is described with reference to FIG. 2.

In this figure, the network structure is identical to the one described in FIG. 1. Again we have a mobile terminal UE moving between cells CELL1 and CELL2. However, management of terminal location and identification is performed as described below.

When the terminal is turned on, it is located at position a. It transmits its IMSI number to the MSC, as well as an indication that it can operate utilizing a table of identifiers for storing different identifiers. In addition, the terminal specifies the support mode for this feature. For example, it indicates whether it will store the identifiers itself or the identifiers will be stored on the network.

In response, the MSC sends it an identification number TMSI1. The table of identifiers TABL is then created, and the identifier TMSI1 is stored there. In FIG. 2, the arrow pointing to TMSI1 indicates that this is the identifier used by the mobile terminal.

When it moves to position b, the terminal transmits its number TMSI1 in order to receive the new identifier TMSI2. After receiving this identifier, the table of identifiers is updated to include it.

When it moves to position c, as the table of identifiers already has an identifier associated with the cell CELL1 for the terminal, it is unnecessary to request a new identifier. The table of identifiers is modified to indicate that it is now the identifier TMSI1 which is used instead of TMSI2.

At this point, in comparison with the prior art process described with reference to FIG. 1, one set of exchanges with the network has been saved by the process according to this embodiment of the invention.

When it moves to position d, as the table of identifiers already contains the identifier TMSI2 associated with the cell CELL2, here again it is unnecessary to request a new identifier. The table of identifiers is therefore modified to indicate that the identifier TMSI2 is now to be used instead of the identifier TMS1.

At this point, in comparison with the prior art process described with reference to FIG. 1, two sets of exchanges with the network have been saved by the process according to this embodiment of the invention.

In this context of the process implemented according to an embodiment of the invention, the number of exchanges with the network for managing the terminal identification and location has been divided in half.

The steps performed by the process are now described in detail with reference to FIG. 3.

After the mobile terminal is turned on during the step STRT, it declares itself to the network.

The terminal then sends a request to the network to determine whether this network handles the use of a table of identifiers for managing terminal identification and location. Then, during the step T301, the mode of management, identification, and location is decided.

If the network does not support the use of a table of identifiers, a conventional prior art process for location and identification management is applied during the step S302.

If the network does support the use of a table of identifiers, the terminal sends a request during the step S303 to obtain an identifier in the network. For this purpose it sends its IMSI number.

The network then assigns the terminal a temporary number associated with the cell in which the terminal is currently located. The terminal receives this identifier during the step S304.

Then, during the step S305, the mobile terminal initializes the table of identifiers and stores the received identifier in it.

Alternatively, the table of identifiers can be initialized by the network.

The table of identifiers can therefore be stored in the mobile terminal or on the network.

When the mobile terminal detects a change of cell during the step T306, it checks whether an identifier associated with the new cell exists in the table of identifiers. This check is done during the step T307.

If such an identifier exists, the mobile terminal changes its current identifier during the step S308 in order to use the identifier found in the table. Then the mobile terminal waits for a new change of cell.

If an identifier for the new cell is not found in the table of identifiers, the terminal sends a request to receive a new identifier from the network during the step S309.

In response, the network assigns a new identifier associated with the new cell to the mobile terminal. This new identifier is received by the mobile terminal during the step S310.

Then, during the step S311, the mobile terminal updates the table of identifiers in order to insert the new identifier and use it until the next change of cell if such occurs.

To avoid the table of identifiers growing indefinitely as the mobile terminal travels from cell to cell, and to optimize its use, various mechanisms can be provided for updating the table of identifiers.

Figure 4:
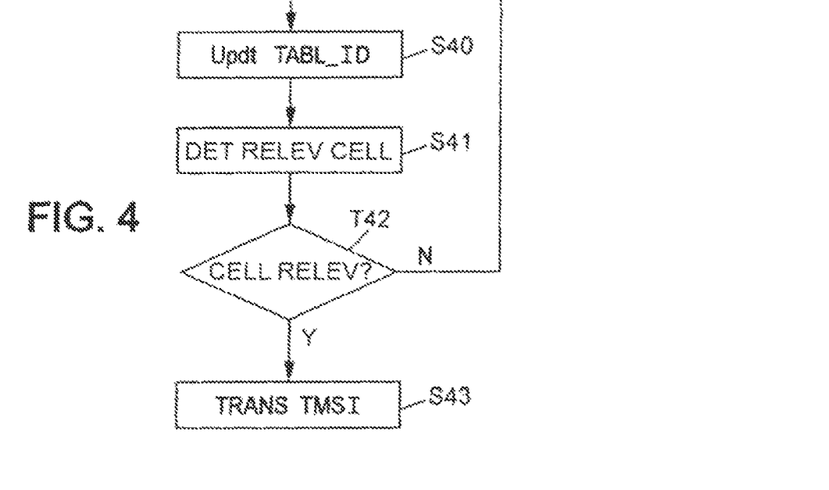
FIGS. 4 and 5 are flow charts of the steps in implementing updates to the table of identifiers according to an embodiment of the invention.
Figure 5:
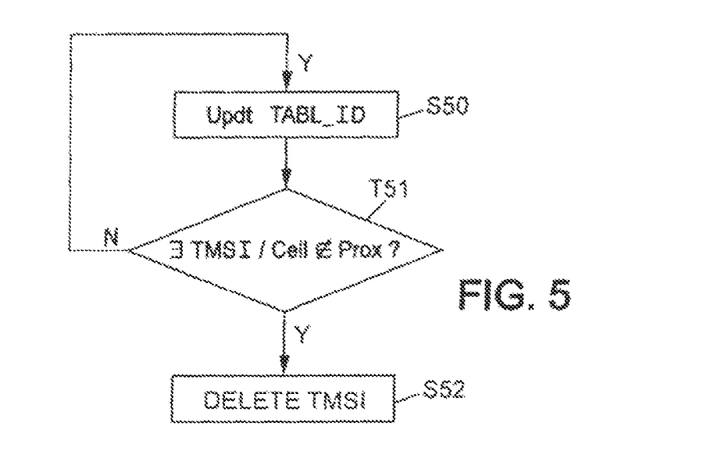

With reference to FIGS. 4 and 5, embodiments are now described of such updating that aim to include mobile terminal identifiers associated with cells the terminal has not yet entered. Such an insertion allows anticipating the assignment of a new identifier based on the travel path of the mobile terminal or the configuration of the cells in the network. Another type of updating is described below, for deleting identifiers from the table of identifiers in order to manage the size of the table.

During the step S40, a request to update the table of identifiers is received either by the mobile terminal or by a network management unit, depending on whether the table of identifiers is stored and managed by the mobile terminal or by the network.

This update request may be received at any time. In particular, it may accompany an identification request from the mobile terminal.

Before assignment of a new identifier, the table of identifiers can thus be reorganized in a relevant manner.

In the process described with reference to FIG. 4, the update request aims to verify the existence of cells which the mobile terminal has not yet entered and which could be relevant to the cell configuration or the travel path of the mobile terminal within the network.

In fact, the network knows the cell configuration as well as the travel path of the mobile terminal at all times.

As will be apparent to a person skilled in the art, it is possible to implement algorithms for predicting the cells the mobile terminal will be entering.

For example, it may be possible to determine statistically which cells the mobile terminal enters most frequently.

For example, these can be the cells covering the residence and work location of the subscriber who is using the mobile terminal.

As a further example, when the mobile terminal travels a given route, it is possible to determine from the direction in the terminal is travelling along the route which cells will be visited by the mobile terminal.

The determination of these cells is done during the step S41. Depending on whether or not a cell is determined to be relevant, as illustrated by the test T42, a new identifier for this cell is delivered by the network then transmitted to the mobile terminal during the step S43.

A request to update the table of identifiers is sent during the step S50, as is shown in FIG. 5.

In the process described with reference to FIG. 5, this update is intended to delete identifiers from the table of identifiers, for example in order to optimize the size of the table of identifiers.

During the step T51, the existence is determined of identifiers associated with cells which do not share coverage area with the cell in which the mobile terminal is currently located.

During this step T51, other measures which will be apparent to a person skilled in the art can be taken in order to choose identifiers to be deleted from the table of identifiers.

If such identifiers are found, the table of identifiers is updated during the step S52 by deleting these identifiers.

Figure 6:
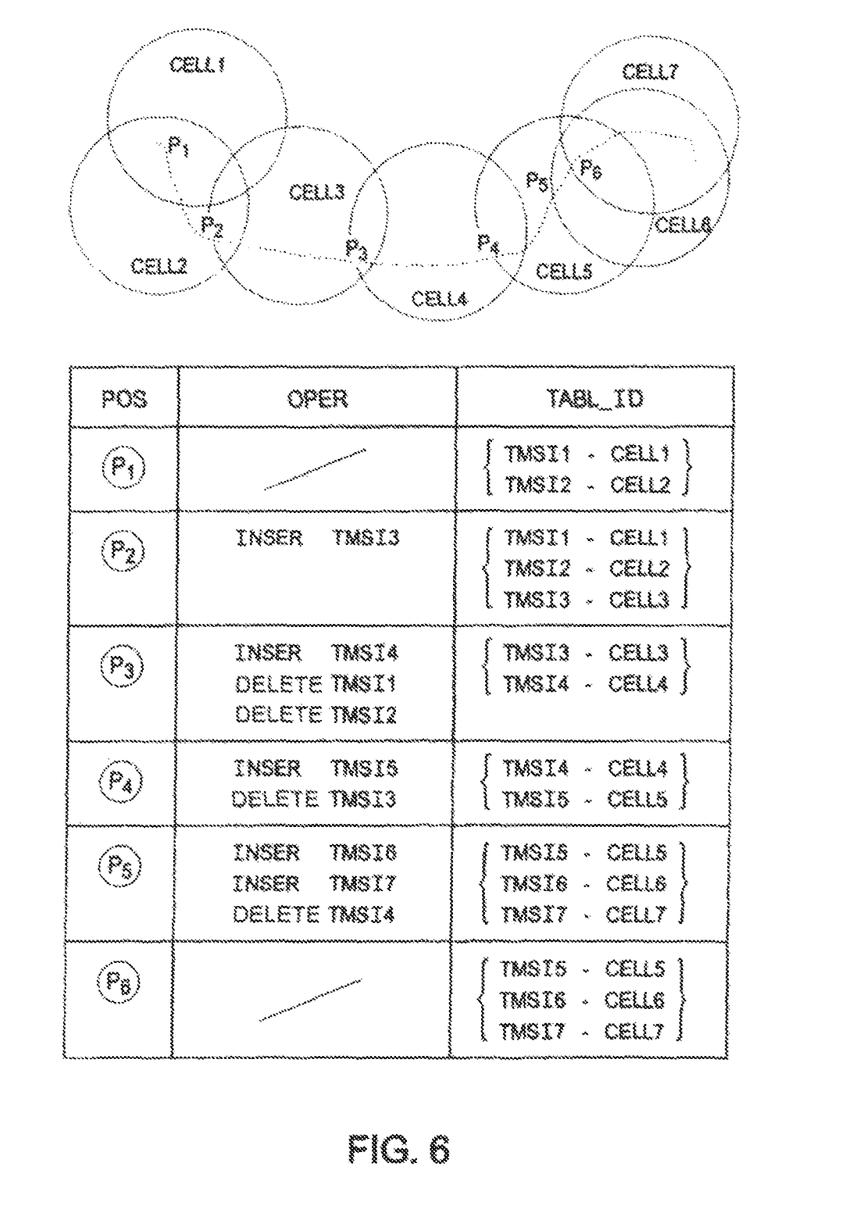
FIG. 6 illustrates the different updates to the table of identifiers in an exemplary travel path of a terminal in the cells of a telecommunications network.

In order to illustrate the mechanisms for updating the table of identifiers, cells CELL1, . . . , CELL7 of a communication network have been represented in FIG. 6. The dotted line represents the travel path of a mobile terminal in these cells.

Different positions P1, . . . , P6 of the mobile terminal have been indicated in order to describe the updates made to the table of identifiers at these various positions.

FIG. 6 also contains a table with a column POS indicating the different positions of the terminal, an OPER column indicating the different operations performed on the table of identifiers, and a TAB_ID column indicating the different states of the table of identifiers.

In the initial position P1, the table of identifiers contains two identifiers TMSI1 and TMSI2 respectively associated with the cells CELL1 and CELL2.

The terminal then travels towards position P2.

As it travels towards this position, it leaves the cell CELL1 and enters the cell CELL3 while remaining in cell CELL2.

It therefore obtains a new identifier associated with the cell CELL3 which must be inserted into the table of identifiers. A new identifier TMSI3 associated with the cell CELL3 is therefore inserted into the table of identifiers.

Because the terminal remains in the cell CELL2, the identifier associated with the cell CELL2 is maintained in the table of identifiers. In addition, because the cell CELL1 shares a coverage area with both cells CELL2 and CELL3, this identifier is also maintained in the table of identifiers.

Next the terminal travels towards position P3.

As it travels towards this position, it leaves the cell CELL2 and enters into the cell CELL4 while remaining in the cell CELL3.

It then receives a new identifier TMSI4 associated with the cell CELL4.

This new identifier is inserted into the table of identifiers. In addition, because the terminal remains in the cell CELL3, the identifier TMSI3 is maintained in the table of identifiers.

However, because the cells CELL1 and CELL2 are not in proximity to the new position P3, the identifiers TMSI1 and TMSI2 are deleted from the table of identifiers.

The terminal then travels towards position P4.

As it travels towards this position, the terminal enters into the cell CELL5 while leaving the cell CELL3 and remaining in the cell CELL4.

The terminal then receives a new identifier TMSI5 associated with the cell CELL5.

The identifier TMSI5 is inserted into the table of identifiers.

Because the cell CELL3 is at a distance from the position P4, the identifier TMSI3 is deleted from the table of identifiers.

Because the terminal remains in the cell CELL4, the identifier TMSI4 is maintained in the table of identifiers.

Next the terminal travels towards position P5.

As it travels towards this position, the terminal remains in the cell CELL5 while leaving the cell CELL4.

The identifier TMSI5 is maintained in the table of identifiers. In addition, the cell CELL4 is in proximity to the position P5, and so the identifier TMSI4 is maintained in the table of identifiers.

The cell CELL6, which the terminal has not yet entered, is close to the position P5. A terminal identifier for this cell is therefore requested then obtained.

In anticipation of the terminal's entry into this cell, this identifier is inserted into the table of identifiers.

In addition, because the cell CELL7 has a large coverage area in common with the cell CELL6, an identifier is also requested for the latter cell. This identifier TMSI7 associated with the cell CELL7 is also inserted into the table of identifiers.

Next the terminal travels towards the position P6.

As it travels towards this position, the terminal remains in the cell CELL5 and enters into both CELL6 and CELL7.

Because identifiers for these two cells were already inserted into the table of identifiers, it is not necessary to request new identifiers.

Thus, depending on the cell used, the corresponding identifier will be used for communicating with the network.

Figure 3:
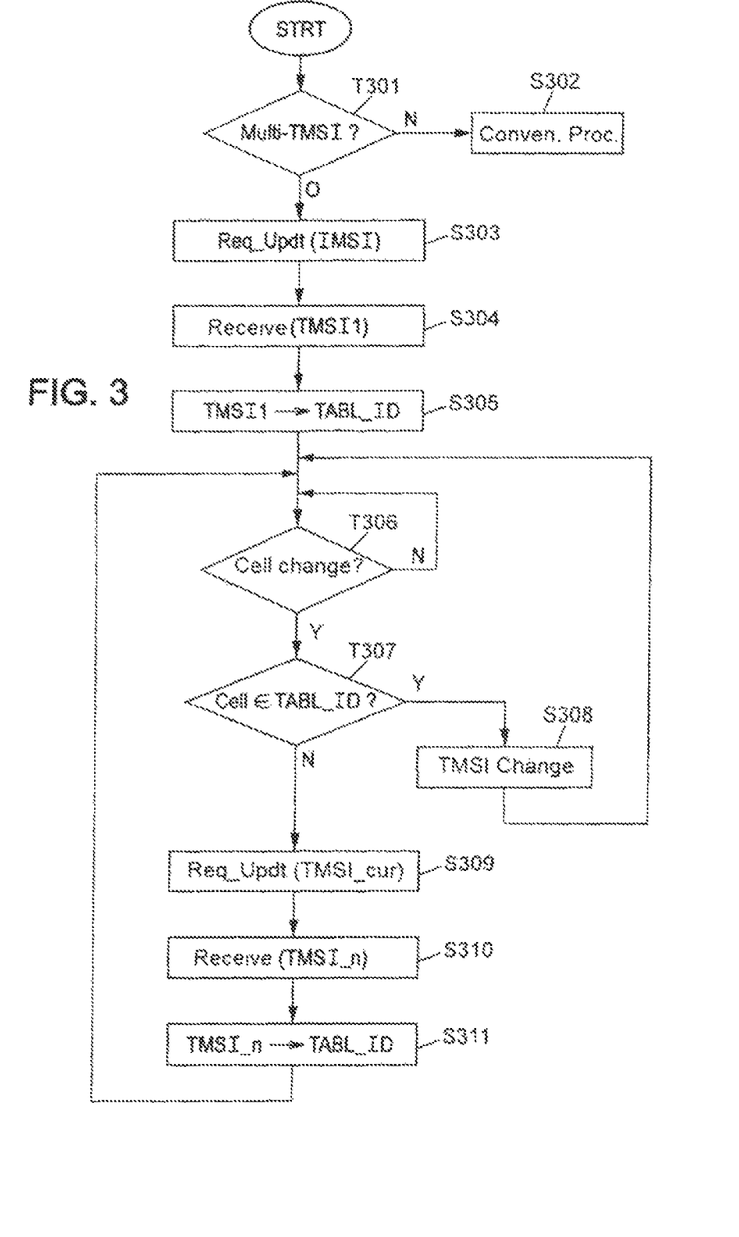
FIG. 3 is a flow chart of the steps in implementing the method according to an embodiment of the invention.

A computer program for implementing the method of the invention can be realized using a general algorithm deduced from the general flow charts in FIGS. 3, 4 and 5 and the present description.

Figure 7:
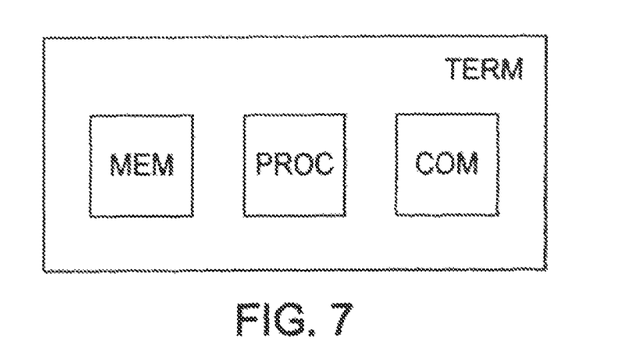
FIGS. 7 and 8 respectively illustrate a terminal and a network management unit according to embodiments of the invention.

A mobile terminal of the invention is represented in FIG. 7. This terminal comprises a communication unit COM, a memory MEM, and a processing unit PROC comprising a processor. The communication unit allows the terminal to communicate with the network in order to implement different types of communication. The memory is used to store various data for calculations by the processing unit. In addition, the memory can store a computer program of the invention for its implementation by the processing unit.

Figure 8:
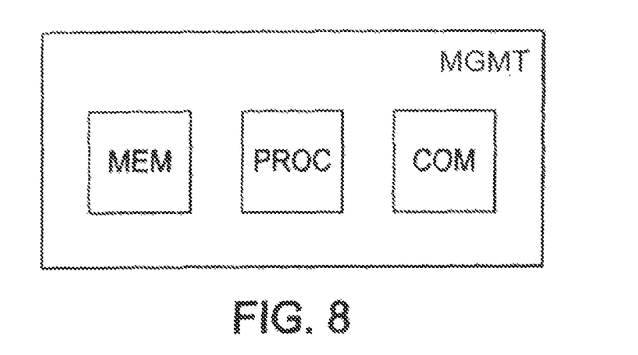

A network management unit of the invention is represented in FIG. 8. For example, this network management unit corresponds to an MSC. It can also correspond to other elements of a telecommunications network which enable terminal location and identification management within the network.

This management unit comprises a communication unit COM, a memory MEM, and a processing unit PROC comprising a processor. The communication unit allows the management unit to communicate with the network in order to implement different types of communication. The memory is used to store various data for calculations by the processing unit. In addition, the memory can store a computer program of the invention for its implementation by the processing unit.

Of course, the invention is not limited to the embodiments described here. It extends to all equivalent variations.

The invention claimed is:

1. A location management method for a mobile terminal in a telecommunications network in which the mobile terminal can travel from a first cell in the network to a second cell in the network, said method, implemented on the mobile terminal, comprising:

receiving a first TMSI identifier by the mobile terminal while in a first cell, the first TMSI identifier associated with the first cell, said first TMSI identifier enabling locating the mobile terminal in the network when the mobile terminal is within the first cell;

receiving a second TMSI identifier by the mobile terminal when the mobile terminal moves to a second cell, the second TMSI identifier associated with the second cell, said second TMSI identifier enabling locating the mobile terminal in the network when the mobile terminal is within the second cell;

storing the first TMSI and second TMSI identifiers in a table of identifiers for later use;

being able to use the first TMSI identifier at a later time or to use the second TMSI identifier at a later time depending on whether the mobile terminal moves from the second cell to a third cell then back to the first cell and uses the first TMSI identifier again or moves from the second cell to a third cell then back to the second cell and uses the second TMSI identifier again;

detecting entry back into the second cell after being in the third cell;

verifying whether an identifier, such as the second TMSI identifier, associated with the second cell exists in the table of identifiers;

when the second TMSI identifier associated with the second cell exists in the table of identifiers, using the second TMSI identifier in the second cell and not sending an identity request or receiving another TMSI identifier from a network management unit;

and when the identifier, such as the second TMSI identifier, does not exist in the table of identifiers:

sending the identification request to the network management unit; and receiving another second TMSI identifier, said second TMSI identifier being delivered by the management unit.

2. The method according to claim 1, wherein the table of identifiers is stored on the mobile terminal or on a network management unit.

3. The method according to claim 1, further comprising:
receiving a message to update the table of identifiers.

4. The method according to claim 3, wherein the message to update comprises a third TMSI identifier associated with a third cell which shares coverage area with one of the first or second cells, the third TMSI identifier being intended for storing in the table of identifiers.

5. The method according to claim 3, wherein the message to update comprises a designation of a TMSI identifier to be deleted from the table of identifiers when the TMSI identifier is associated with a cell that does not share coverage area with a present cell that the mobile terminal is in.

6. The method according to claim 5, further comprising, prior to receipt of the update message:
sending by the mobile terminal a message to update requesting the deletion of a TMSI identifier from the table of identifiers.

7. The method according to claim 3, further comprising:
determining that the third cell shares coverage area with the second cell; and
sending a third TMSI identifier for the mobile terminal, associated with the third cell, to the mobile terminal.

8. The method according to claim 1, further comprising the following steps implemented in a network management unit:
receiving from the mobile terminal a request for identification of the mobile terminal in the second cell;
sending the second TMSI identifier for the mobile terminal by the network management unit to the mobile terminal.

9. The method according to claim 8, further comprising:
determining a TMSI identifier to be deleted from the table of identifiers due to the TMSI identifier being associated with a cell that does not share coverage with the first or second cells; and
sending a message comprising a designation of the TMSI identifier for its deletion from the table.

10. The method according to claim 1, wherein the method is performed by a mobile terminal processor.

11. A location management method for a mobile terminal in a telecommunications network in which the mobile terminal can travel from a first cell in the network to a second cell in the network, said method, implemented by the mobile terminal, comprising:
receiving a first TMSI identifier by the mobile terminal when the mobile terminal is in the first cell, the first TMSI identifier being associated with the first cell, said first TMSI identifier enabling locating the mobile terminal in the network when the mobile terminal is within the first cell;
receiving a second TMSI identifier by the mobile terminal when the mobile terminal is in the second cell, the second TMSI identifier being associated with the second cell, said second TMSI identifier enabling locating the mobile terminal in the network when the mobile terminal is within the second cell;
storing the first TMSI and second TMSI identifiers in a TMSI table of identifiers that is updated and maintained while the mobile terminal travels from a first to a second and then to another adjacent cell; and
being able to re-use the first TMSI identifier or to re-use the second TMSI identifier when the mobile terminal returns to the first or the second cell from the another adjacent cell;
detecting entry back into the second cell after being in another adjacent cell;
verifying whether an identifier, such as the second TMSI identifier, associated with the second cell exists in the table of identifiers;
when the second TMSI identifier associated with the second cell exists in the table of identifiers, re-using the second TMSI identifier in the second cell and not sending an identity request or receiving another TMSI identifier from a network management unit;
and when the identifier, such as the second TMSI identifier, does not exist in the table of identifiers:
sending the identification request to the network management unit; and
receiving a new second TMSI identifier, said new second TMSI identifier being delivered by the management unit.

12. A location management method for a mobile terminal in a telecommunications network in which the mobile terminal can travel from a first cell in the network to a second cell in the network, said method comprising:
receiving an indication from the network indicative that the network handles the use of a table of TMSI identifiers for managing mobile terminal identification and location;
receiving while in the first cell a first TMSI identifier for the mobile terminal, the first TMSI identifier being associated with the first cell, said first TMSI identifier enabling locating the mobile terminal in the network when the mobile terminal is within the first cell;
receiving when the mobile terminal moves to the second cell a second TMSI identifier for the mobile terminal, the second TMSI identifier being associated with the second cell, said second TMSI identifier enabling locating the mobile terminal in the network when the mobile terminal is within the second cell;
storing the first TMSI and second TMSI identifiers in the TMSI table of identifiers for later use; and
being able to use the first TMSI identifier or to use the second TMSI identifier depending on whether the mobile terminal moves from the second cell to another cell then back to the first cell and uses the first TMSI identifier again or moves from the second cell to another cell then back to the second cell and uses the second TMSI identifier again;

detecting entry back into the second cell after being in another cell;

verifying whether an identifier, such as the second TMSI identifier, associated with the second cell exists in the table of identifiers;

when the second TMSI identifier associated with the second cell exists in the table of identifiers, re-using the second TMSI identifier in the second cell and not sending an identity request or receiving a new TMSI identifier from a network management unit;

and when the identifier, such as the second TMSI identifier, does not exist in the table of identifiers:

sending the identification request to the network management unit; and receiving a new TMSI identifier, said new TMSI identifier being delivered by the management unit.

* * * * *